(12) United States Patent
Buch et al.

(10) Patent No.: US 11,585,022 B2
(45) Date of Patent: Feb. 21, 2023

(54) TRANSPORT OR DRIVE BELT AND WEAVING COMB SUITABLE FOR THE PRODUCTION THEREOF

(71) Applicant: FORBO SIEGLING GMBH, Hannover (DE)

(72) Inventors: Torsten Buch, Wedemark (DE); Neele Neelen, Einbeck (DE); Lennart Schulz, Hannover (DE)

(73) Assignee: FORBO SIEGLING GMBH, Hannover (DE)

( * ) Notice: Subject to any disclaimer, the term of this patent is extended or adjusted under 35 U.S.C. 154(b) by 197 days.

(21) Appl. No.: 16/068,683

(22) PCT Filed: Dec. 20, 2016

(86) PCT No.: PCT/EP2016/081863
§ 371 (c)(1),
(2) Date: Jul. 9, 2018

(87) PCT Pub. No.: WO2017/121582
PCT Pub. Date: Jul. 20, 2017

(65) Prior Publication Data
US 2019/0017198 A1 Jan. 17, 2019

(30) Foreign Application Priority Data
Jan. 11, 2016 (DE) ..................... 10 2016 100 354.9

(51) Int. Cl.
| D03D 13/00 | (2006.01) |
| B65G 15/54 | (2006.01) |
| D03D 1/00 | (2006.01) |
| D03D 49/62 | (2006.01) |

(52) U.S. Cl.
CPC ............. *D03D 13/00* (2013.01); *B65G 15/54* (2013.01); *D03D 1/0094* (2013.01); *D03D 13/004* (2013.01); *D03D 49/62* (2013.01)

(58) Field of Classification Search
CPC .... D03D 13/00; D03D 1/0094; D03D 13/004; D03D 2700/02; D03D 2700/03; D03D 3/04; B65G 15/54
USPC ................................ 474/267; 428/193, 36.1
See application file for complete search history.

(56) References Cited

U.S. PATENT DOCUMENTS

| 1,823,034 | A | * | 9/1931 | Dworsky | ............... | D03D 15/08 |
| | | | | | | 442/182 |
| 3,328,864 | A | | 7/1967 | Cumbers | | |
| 4,177,839 | A | | 12/1979 | Kikuchi | | |

(Continued)

FOREIGN PATENT DOCUMENTS

| CH | 411739 A | 4/1966 |
| CN | 202730381 U | 2/2013 |

(Continued)

*Primary Examiner* — Peter Y Choi
*Assistant Examiner* — Jenna N Chandhok
(74) *Attorney, Agent, or Firm* — Leydig, Voit & Mayer, Ltd.

(57) ABSTRACT

A transport or drive belt includes: warp threads extending in a longitudinal direction; and weft threads extending between side edges. The weft threads and the warp threads cross each other at least sectionally with a positive inclination or a negative inclination deviating from a right angle. The weft threads follow a wavy course.

9 Claims, 2 Drawing Sheets

(56) References Cited

U.S. PATENT DOCUMENTS

| | | | |
|---|---|---|---|
| 5,394,906 A * | 3/1995 | Farley | B29C 70/222 |
| | | | 139/384 R |
| 5,840,636 A | 11/1998 | Mitsutsuka et al. | |
| 2004/0121869 A1* | 6/2004 | Becella | D03D 1/0094 |
| | | | 474/260 |
| 2009/0007981 A1 | 1/2009 | Khokar | |
| 2009/0014122 A1 | 1/2009 | Arakawa et al. | |
| 2010/0035499 A1 | 2/2010 | Kismir et al. | |

FOREIGN PATENT DOCUMENTS

| | | |
|---|---|---|
| DE | 580631 C | 7/1933 |
| DE | 1535153 A | 9/1970 |
| DE | 19543975 C1 | 3/1997 |
| DE | 102009034299 A1 | 1/2011 |
| EP | 0775648 A2 | 5/1997 |
| JP | S 46016131 Y | 6/1971 |
| JP | S 46034833 Y | 12/1971 |
| JP | S 49070262 U | 6/1974 |
| JP | S 52165971 U | 12/1977 |
| JP | H 01094480 U | 6/1989 |
| JP | H 03022080 U | 7/1989 |
| JP | H 09278137 A | 10/1997 |
| JP | 2010520381 A | 6/2010 |
| JP | 2014205528 A | 10/2014 |
| WO | WO 2005110728 A1 | 11/2005 |

\* cited by examiner

TRANSPORT OR DRIVE BELT AND WEAVING COMB SUITABLE FOR THE PRODUCTION THEREOF

CROSS-REFERENCE TO PRIOR APPLICATIONS

This application is a U.S. National Phase application under 35 U.S.C. § 371 of International Application No. PCT/EP2016/081863, filed on Dec. 20, 2016, and claims benefit to German Patent Application No. DE 10 2016 100 354.9, filed on Jan. 11, 2016. The International Application was published in German on Jul. 20, 2017 as WO 2017/121582 under PCT Article 21(2).

FIELD

The present invention refers to a transport or drive belt having warp threads extending in the longitudinal direction and weft threads extending between the side edges. The invention also refers to a weaving comb, also called a reed, for use in the invention.

BACKGROUND

Such transport or drive belts are composed of a textile flat structure formed in particular by a plurality of layers, wherein the layered structure may vary considerably depending on the desired use and the corresponding requirements. A typical structure of such a transport and drive belt comprises the traction member composed of warp and weft threads for transmitting the forces acting during operation, a support layer acting as a support surface for the products to be transported, and a running surface which is used as a contact surface for a support.

Each individual warp thread has to be guided through a heald and through the weaving reed (reed), before it may be woven on the so-called cloth beam of the loom. During weaving, the fabric grows due to the introduction of weft threads at right angles to the warp threads.

The weft threads are associated to different shafts through the healds, through which they pass. By lifting and lowering the heald shafts, individual warp threads are lifted or lowered, in order to form the shed. The combination of warp threads, which are simultaneously lifted and lowered, as well as the sequence, according to which the different combinations of warp threads are successively lifted or lowered, determines the weave.

With the aid of a reed, also called a weaving comb, each weft thread is fixedly abutted against the previously produced flat surface. Such weaving combs are composed of a great number of mutually parallel holders, which form slits therebetween, through which the warp threads may pass. Weaving combs have to be adapted to the respective requirements and are thus known in a variety of embodiments. DE 1 535 153 A, for example, discloses a weaving comb having a variable distance.

The three basic weaves comprise the plain weave, the most basic textile type of weave, in which the weft alternatively passes over and under the individual warp threads, the satin weave, and the twill weave, in which the weft is guided under at least one warp thread and then over at least two warp threads. The following weft thread offsets this cycle laterally, so that a typical diagonal pattern is formed, which is called a twill or diagonal ridge.

Fundamentally in all types of weaves for such transport or drive belts is the fact that the weft threads have to extend with the highest precision possible at right angles with respect to the warp threads. The perpendicular extension in particular is a quality characteristic of the transport or drive belt, since a different course of the weft threads may cause the transport or drive belt to move sideways, thus considerably increasing the difficulty of centering over a support, in particular a deflection or support roller.

When using such transport or drive belts in areas accessible to people, such as in passenger transport belts within buildings or treadmills in the area of fitness, the noise thus created represents a drawback. In particular, high frequency acoustic vibrations are perceived as annoying.

Modifying the layered structure of the transport or drive belt by using an additional damping layer has already been considered, so that an improved acoustic damping effect is obtained or at least the frequency of vibrations is transferred into another region. However, this causes undesired higher production costs.

EP 0 775 648 A2 discloses a transport belt having a running side fabric, which contains staple fiber yarns, and which has a twill weave with an inclination angle of 10° to 70° with respect to the running direction of the transport belt. The warp threads are surrounded by staple fibers and extend diagonally over the entire width of the conveyor belt, whereby also in an edge course an endless support of the staple fiber yarn is obtained. Thereby a uniform, vibration-free and low-noise motion of the transport belt is obtained. The running side fabric may to this end be particularly provided with a zig-zag twill or a twill weave having a herringbone ridge arrangement.

DE 10 2009 034 299 A1 further discloses a wire fabric, which may be used as a serigraphic fabric having a plurality of warp wires and weft wires, in which the wire crossing angle of the warp and weft wires deviates by more than 3° from a right angle. According to a variant, the wire fabric may be provided with two fabric portions, which are configured with mirror symmetry to a central warp wire. The corresponding weaving reed is correspondingly symmetrical. The object of the invention is to provide a possible solution for reducing the undesired noise caused during operation of the transport or drive belt, without requiring an additional damping layer or a sound reducing coating of the transport or drive belt. Another object of the invention is to provide a weaving comb suitable for such a transport or drive belt.

SUMMARY

In an embodiment, the present invention provides a transport or drive belt, comprising: warp threads extending in a longitudinal direction; and weft threads extending between side edges, wherein the weft threads and the warp threads cross each other at least sectionally with a positive inclination or a negative inclination deviating from a right angle, and wherein the weft threads follow a wavy course.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
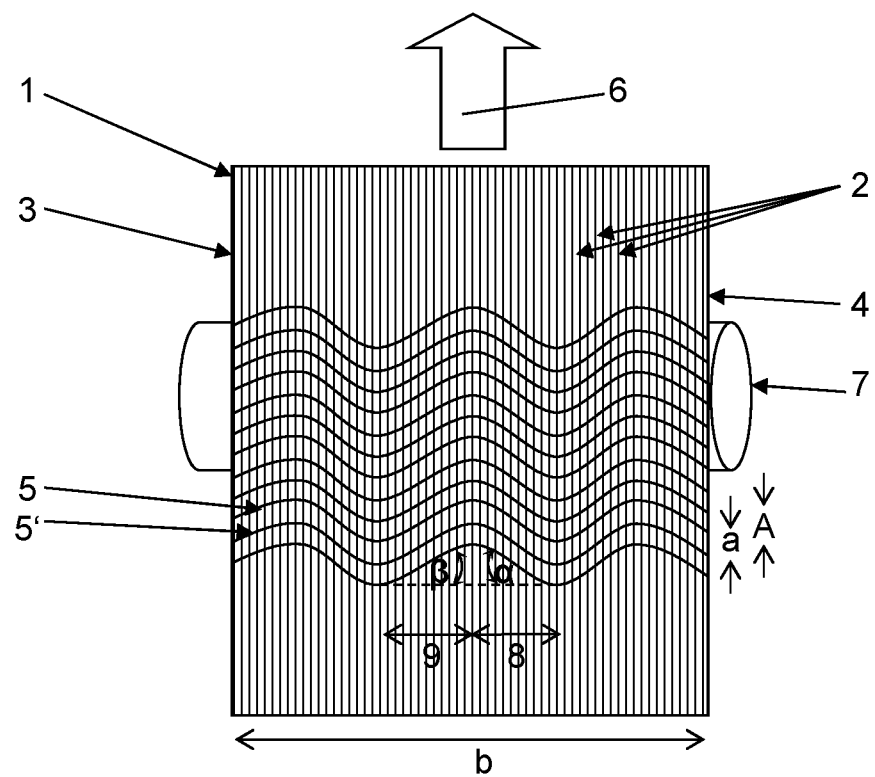
FIG. 1 shows a view from above on an inventive transport or drive belt having a wavy course of the weft threads on a support.

According to the invention a transport or drive belt is thus proposed, in which weft threads are at least sectionally extending with a sectionally positive inclination and negative inclination with respect to the shortest connection between the side edges, while deviating from a straight line which is perpendicular to the warp threads, wherein the weft threads follow a wavy course. The invention is based on the surprisingly simple recognition that the undesired noise may be significantly and effectively reduced, without any additional use of materials, in particular without a dampening layer, if during the movement of the transport or drive belt on a support, such as a guide, a base, or a roller, the respective weft thread does not impinge simultaneously on the support over the entire width, but with a temporal delay with respect to different portions, in the direction of the total width of the transport or drive belt. This effect is achieved by means of a course of the weft threads which at least in individual portions, is preferably inclined in opposite directions with respect to the transversal extension relative to the warp threads, in that the weft threads have an inclination relative to the shortest connection straight line of the side edges. In this way a simultaneous impingement of a respective weft thread over the entire width of the roller or of a plate-like support is avoided. Although the physical effect causing the generation of sound is still not completely understood, currently it is assumed that it is spawned in the gap area also called a gusset, between the transport or drive belt and the support. In particular, in the state of the art, the weft threads, which emerge with respect to an outer surface of the transport or drive belt facing the support, shortly before the impinging of the transport or drive belt on the support, enclose a volume of air with the latter, which volume of air is abruptly displaced in the closing gap. As a consequence, a periodical air vibration takes place, which causes the undesired noise. Due to the inventive inclined course of the weft threads, the enclosed air volume is laterally displaced in parallel to the axial direction of the support and thus continuously escapes. A periodic vibration excitation is thus effectively avoided, wherein the weft threads follow a wavy course, in particular having amplitudes on both sides of a straight line which is perpendicular to the warp threads. The wavy form involves a continuous variation of the inclination angle, whereby undesired abrupt changes of direction may be prevented. In particular, by means of a multiple inversion of the inclination, the enclosed air volume in the gusset increases and decreases periodically, effectively contrasting the vibrational excitation.

A particularly advantageous embodiment is also obtained in that the weft threads between the edges have at least one first region having a positive inclination comprising a direction component in the running direction and a second region having a negative inclination comprising a direction component against the running direction, so that a possible lateral deviation of the transport or drive belt due to the inclined course of the weft threads may be compensated by the respective opposed inclination in the first and second region. The inclination angle relative to the transversal axis of the transport or drive belt is configured, preferably in a corresponding way, as the shortest connection line between the side edges.

Moreover, it has proved advantageous to provide the regions with a positive inclination angle and the regions with a negative inclination angle with the same size, in order to mutually cancel the forces which otherwise would deviate the transport or drive belt laterally.

Moreover, depending on the application, it may be useful to provide regions with a positive inclination angle and regions with a negative inclination angle having different sizes. Uses are conceivable, in which for example, due to a constant lateral input, a laterally inclined transport surface, or oblique deviation rollers or support rollers, a permanent skewing of the transport belt would ensue. For such applications, the required force guide was obtained up till now for example by means of reinforced belt edges with a stitched bead. These may be replaced by weaving structures which are purposefully unevenly distributed, thus causing a permanent skewed movement.

In this case it has already been found that a regular wavy course of the weft threads, thus a course of the weft threads having a constant wavelength and amplitude, is particularly convenient in preventing an irregular transmission of force between the transport or drive belt on one hand and the support on the other. Moreover, the transport or drive belt may thus also be cut in the longitudinal direction, if required, and the total width may be reduced, step by step, without changing the advantageous properties of the wavy course of the weft threads.

The weft threads may extend along a zig-zag course between the side edges. In a further also promising embodiment of the invention, the weft threads extend continuously between the side edges, so that in particular jump points may be avoided, at which an inversion of direction of weft threads and thus an acoustically perceivable impingement on the support occurs.

A further also particularly practical modification of the present invention is obtained in that adjacent weft threads have a constant distance from one another, in particular over the entire width of the transport or drive belt, so that a recurring image of the weft threads in the plane of the transport or drive belt is obtained. The distance between each weft thread and the preceding and the following weft thread in the direction of the main axis of the transport or drive belt is thus identical.

In another particularly promising embodiment of the invention, the distance between a weft thread and an adjacent weft thread is smaller, in the direction of the central longitudinal axis of the transport or drive belt, than the amplitude of the weft thread. Thus, it is ensured that in each operational phase, at least one weft thread is contacting the support. Thus, also with such weft threads, which clearly protrude over the surface of the transport or drive belt, no abrupt lifting of the transport or drive belt with respect to the support takes place, since the transport or drive belt is always resting with one or more weft threads on the support. Shortly before reaching the amplitude level against the direction of movement of the transport or drive belt of the wavy weft thread, the amplitude level of the following weft thread is already impinging on the support.

It may also be advantageous when the distance of at least one weft thread is different with respect to the distances of the remaining weft threads. In this way by a predetermined aperiodic impinging of the weft threads, a periodically recurring air flow and thus a possible vibrational excitation may be avoided. The distance between adjacent weft threads is preferably between 0.5 mm and 25 mm, in particular between 5 mm and 15 mm.

The object of the invention is also achieved with a transport or drive belt having warp and weft threads crossing each other at right angles, which are connected by means of a twill weave of the fabric with a diagonal pattern, so that the floats have an offset over the width of the transport or drive belt, in the direction of the warp threads, in that the inclination or slope of the diagonal pattern as a virtual connecting line of the respective centers of the float over the width of the transport or drive belt between the side edges has an inversion at least once. Due to the fact that in the twill weave, which is known per se, the so called float, as a thread extent, which rests, without bindings, as a warp thread over a number of weft threads, and which is obtained by the following weft thread being offset by at least one warp thread, a skewing effect is provided, so that a diagonal ridge is produced, the inclination of which relative to the course of the weft threads has an inclination, i.e. is inclined. The twill weave is provided in such a way that the inclination of the ridge in a first region is positive and in a second region is negative, in order to provide the desired effect of a starting point varying over the width of the support. Thus, the offset of adjacent floats is not constant but varies at least in one inversion point.

In another embodiment of the invention, the length of the float between the side edges over the width is at least sectionally differently sized, wherein the length of the float in particular in a region including the central longitudinal axis of the transport or drive belt is shorter than the regions respectively adjacent to the side edges. In this way, in operation, not only the time of impingement of the float on the support varies but also, due to the different length of the float, the duration of the contact with the support. Due to the wavy course of the ridge, different starting points of the weft threads are obtained over the width of a deflection roller or a support surface, over time, so that the enclosed air volume may be displaced transversally to the transport direction, and thus cyclical or abrupt air emissions may be prevented, thus facilitating a continuous displacement process.

The invention also solves the object by means of a reed, also called a weaving comb, for producing a fabric for a transport or drive belt according to at least one of the preceding claims, in that the weaving comb has a corrugated support surface which is adapted for contacting the respective weft thread and which extends in different planes.

FIG. 1 shows a view from above on an inventive transport or drive belt 1 having warp threads 2 extending in the longitudinal direction and weft threads 5, which extend between the side edges 3, 4. The weft threads 5 are positioned in the main extension plane of the transport or drive belt 1 and follow a wavy course, so that at least sectionally deviating from a straight line perpendicular to the warp threads 2, a positive inclination α with respect to the direction of movement 6 and a negative inclination β with respect to the direction of movement 6, is sectionally obtained. In this way, during movement of the transport belt 1 on the support 7, which in this case is a guide roller, the respective weft thread 5 does not impinge on the support 7 simultaneously over its entire width b, but with a delay with respect to different regions 8, 9, which are widthwise portions of the transport belt 1, wherein the region 8 corresponds to the positive inclination α and the region 9 corresponds to the negative inclination β.

Figure 2:
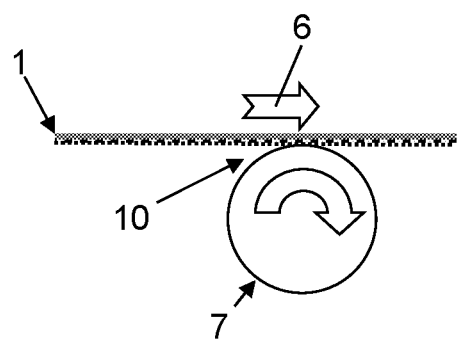
FIG. 2 shows the transport or drive belt shown in FIG. 1 in a cross-sectional view.

As may in particular be seen in connection with FIG. 2, in this way air is displaced laterally in the gap area 10 also called a gusset between the transport belt 1 and the support 7 and in particular, differently from the state of the art, without an abrupt escape. Thus, the main cause of vibrational excitation is avoided, and an efficient noise reduction is achieved. Since the distance a between a weft thread 5 and an adjacent weft thread 5' in the direction of the warp threads 2, is smaller than the amplitude A of the respective weft thread 5, also the transition from one weft thread 5 to the following weft thread 5' occurs without interruptions. On the contrary, at least one region 8, 9 of at least one weft thread 5, 5' is always contacting the support 7.

Figure 3:
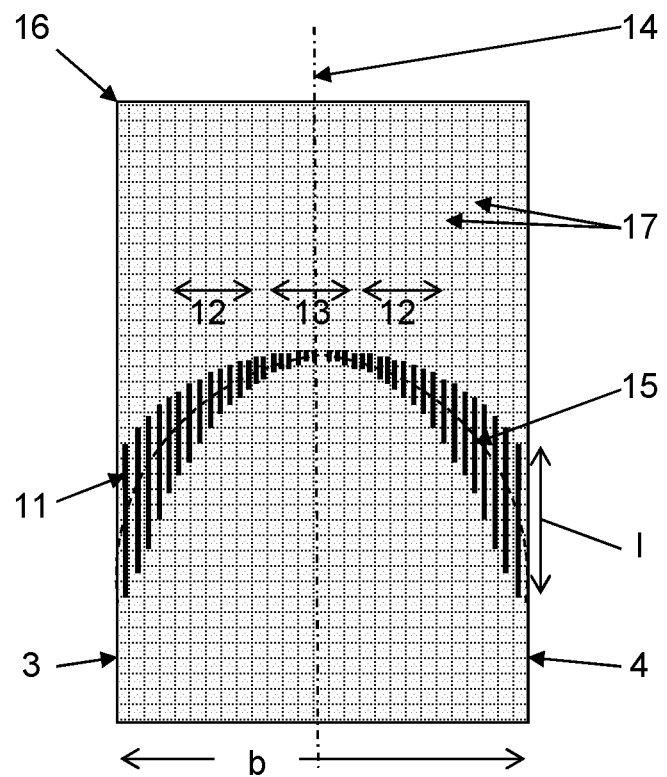
FIG. 3 shows a variant of a transport or drive belt having a twill weave.

FIG. 3 additionally shows a variant of a transport belt 16, in which the warp threads 2 and the weft threads 17 cross each other at right angles and are connected by a twill weave of the fabric in a diagonal pattern. The regions called floats 11 between the side edges 3, 4, which rests without weaving of the warp threads 2 over a number of weft threads 17, thus have, over the width b of the transport belt 16, an offset in the direction of the warp threads 2. Since the length l of the float between the side edges 3, 4 varies and in the respective region 12 facing the side edges 3, 4 is longer than in a region 13 near a central longitudinal axis 14, the inclination α of the diagonal pattern of a virtual connection line 15, also called a ridge, of the respective centers of the float 11, follows, over the width b of the transport belt 16 between the side edges 3, 4, a wavy course having an inversion point, which is only illustratively shown in this case, in the region of the central longitudinal axis 14, in order to provide the desired effect of a starting point varying over the width (b) of the support 7. Thus, also the offset of adjacent floats 11 is not constant but varies on its course between the side edges 3, 4.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

REFERENCE LIST 1 transport belt
2 warp thread
3 side edge 4 side edge
5, 5' weft thread
6 direction of movement
7 support
8 region
9 region
10 gap region
11 float
12 region
13 region
14 central longitudinal axis
15 connection line
16 transport belt
17 weft thread
α inclination
β inclination
b width
a distance
A amplitude
l length

The invention claimed is:

1. A belt device comprising:
a support; and
a belt disposed on the support and comprising warp threads and weft threads and having a first side edge and second side edge parallel to a longitudinal direction of the belt, wherein the longitudinal direction of the belt corresponds to a direction of movement in a main extension plane of the belt over the support,
wherein the warp threads extend in the longitudinal direction and the weft threads extend between the first and second side edges,
wherein the weft threads cross the warp threads with a positive inclination or a negative inclination deviating from a right angle relative to the warp threads, and
wherein the weft threads follow, in the main extension plane of the belt, a wavy course from the first side edge to the second side edge.

2. The belt device of claim 1, wherein the weft threads have, between the side edges, at least a first region with a positive inclination having a direction component with respect to a direction of movement of the belt and a second region with a negative inclination having a direction component with respect to the direction of movement of the belt.

3. The belt device of claim 1, wherein the weft threads follow a regular wavy course.

4. The belt device of claim 1, wherein the weft threads extend symmetrically with respect to a central longitudinal axis.

5. The belt device of claim 1, wherein the weft threads extend continuously between the side edges.

6. The belt device of claim 1, wherein adjacent weft threads are arranged at a constant distance from each other along an entire width of the belt.

7. The belt device of claim 1, wherein a distance of a weft thread from an adjacent weft thread is smaller than an amplitude of the wavy course of the weft thread.

8. The belt device of claim 7, wherein the distance of at least one weft thread is different from distances of other weft threads.

9. A belt moveable in a longitudinal direction in a main extension plane over a support, the belt comprising:
a first side edge and a second side edge, each parallel to the longitudinal direction;
warp threads and weft threads crossing each other at right angles, the warp threads and weft threads being connected by a twill weave of a fabric,
wherein a negative and/or a positive inclination of a ridge of the twill weave undergoes at least once an inversion along a width of the belt between first and second side edges, and
a first side region, a second side region, and a central region of the belt, the central region being disposed between the first side region and the second side region, wherein a length of a float of the warp threads in the longitudinal direction in each of the three regions is different along a latitudinal direction of the belt perpendicular to the longitudinal direction, a length of the float of the warp threads in the central region being shorter than a length of the float of the warp threads in either side region, and wherein at least individual adjacent floats have an offset in a direction of a central longitudinal axis, wherein the offset for the individual adjacent floats varies across the latitudinal direction of the belt such that the individually adjacent floats impinge on the support, impingement varying in both a sequence of time and a duration of time.

* * * * *